(12) United States Patent
Isokawa

(10) Patent No.: US 9,307,097 B2
(45) Date of Patent: Apr. 5, 2016

(54) IMAGE FORMING APPARATUS

(71) Applicant: Konica Minolta, Inc., Chiyoda-ku, Tokyo (JP)

(72) Inventor: Hiroshi Isokawa, Hino (JP)

(73) Assignee: KONICA MINOLTA, INC. (JP)

( * ) Notice: Subject to any disclaimer, the term of this patent is extended or adjusted under 35 U.S.C. 154(b) by 0 days.

(21) Appl. No.: 14/730,814

(22) Filed: Jun. 4, 2015

(65) Prior Publication Data

US 2015/0358489 A1 Dec. 10, 2015

(30) Foreign Application Priority Data

Jun. 4, 2014 (JP) .................................. 2014-115426

(51) Int. Cl.
 *H04N 1/00* (2006.01)
 *H04N 1/40* (2006.01)

(52) U.S. Cl.
 CPC ....... *H04N 1/00087* (2013.01); *H04N 1/00795* (2013.01); *H04N 1/40* (2013.01)

(58) Field of Classification Search
 CPC .... H04N 1/00087; H04N 1/40; H04N 1/6033
 USPC .............. 358/1.9, 2.1, 504, 518, 1.6; 382/167
 See application file for complete search history.

(56) References Cited

U.S. PATENT DOCUMENTS

2002/0122209 A1* 9/2002 Yoshida ............... H04N 1/6033
 358/2.1

FOREIGN PATENT DOCUMENTS

| JP | 2004198947 A | 7/2004 |
|---|---|---|
| JP | 2008008967 A | 1/2008 |

* cited by examiner

*Primary Examiner* — Jamares Q Washington
(74) *Attorney, Agent, or Firm* — Cantor Colburn LLP

(57) ABSTRACT

An image forming apparatus, including: an image forming section; a reading section which reads the image formed by the image forming section over a predetermined width in a width direction of the sheet; a colorimeter which reads the image over a width smaller than the predetermined width; a calibration section which calibrates the reading section on the basis of a difference between first reading section measurement data and first colorimeter measurement data; a specification section which specifies adjacent images having a largest difference in brightness of a predetermined threshold value or more from among images for color adjustment formed on the sheet; and a color adjustment section which controls the colorimeter to read at least one of the adjacent images and adjusts a color of the image formed by the image forming section on the basis of second colorimeter measurement data.

8 Claims, 8 Drawing Sheets

IMAGE FORMING APPARATUS

CROSS REFERENCE TO RELATED APPLICATIONS

The present invention claims priority under 35 U.S.C. §119 to Japanese Application No. 2014-115426, filed Jun. 4, 2014, the entire content of which is incorporated herein by reference.

BACKGROUND OF THE INVENTION

1. Field of the Invention

The present invention relates to an image forming apparatus.

2. Description of Related Art

Electrophotographic image forming apparatuses perform adjustment to maintain image qualities to be constant by forming reference images for image quality adjustment on sheets and changing image forming conditions and such like according to read values obtained by reading the reference images with reading sections (for example, see Japanese Patent Application Laid-Open Publication Nos. 2008-8967 and 2004-198947).

When image reading is performed by using a conventional CCD line sensor, phenomenon (flare) which negatively affects read values is generated in some cases due to emitted light being reflected at a position other than the reference image and entering the CCD. The phenomenon markedly occurs especially in a case where there is a large difference in luminosity (brightness) between adjacent color patches and in a case where a large difference in luminosity occurs due to a color patch of high density arranged on a white sheet. As for image reading using a CCD line sensor, flare has a great tendency to occur in a main scanning direction.

Thus, there have been methods of reducing reflected light from a position other than the image in order to reduce the flare in the main scanning direction. The methods of reducing reflected light from a position other than the image include, for example, a method of coating the inside of the unit with black matte and a method of suppressing reflection of optical system by narrowing an irradiation hole of a light source or providing antireflection coat to a cover glass.

However, it is difficult to completely eliminate reflected light from a position other than image and it is very difficult to completely suppress the flare by the above methods. Thus, even if the above methods are used, there is still a problem that the accuracy of color reproducibility is lowered when the difference in luminosity is large between adjacent color patches or between a high density color patch and a ground color of sheet.

SUMMARY OF THE INVENTION

The present invention has been made in consideration of the above problems, and an object of the present invention is to provide an image forming apparatus which can reproduce colors with high accuracy.

In order to achieve at least one of the above objects, according to one aspect of the present invention, there is provided an image forming apparatus, including: an image forming section which forms an image on a sheet; a reading section which reads the image formed by the image forming section over a predetermined width in a width direction of the sheet; a colorimeter which reads the image over a width smaller than the predetermined width in the width direction of the sheet; a calibration section which calibrates the reading section on the basis of a difference between first reading section measurement data and first colorimeter measurement data, the first reading section measurement data being obtained by reading an image for calibration formed on the sheet with the reading section, and the first colorimeter measurement data being obtained by reading the image for calibration with the colorimeter; a specification section which specifies adjacent images having a largest difference in brightness of a predetermined threshold value or more from among images for color adjustment formed on the sheet; and a color adjustment section which controls the colorimeter to read at least one of the adjacent images specified by the specification section and adjusts a color of the image formed by the image forming section on the basis of second colorimeter measurement data obtained by the colorimeter.

Preferably, in the image forming apparatus, the reading section reads the image formed by the image forming section over an entire width in the width direction of the sheet.

Preferably, in the image forming apparatus, the specification section specifies the adjacent images having the largest difference in brightness of the predetermined threshold value or more from second reading section measurement data obtained by reading the images for color adjustment with the reading section.

Preferably, the image forming apparatus includes a colorimeter moving section which moves the colorimeter in a main scanning direction, wherein the color adjustment section controls the colorimeter moving section to move the colorimeter to a position where the colorimeter is able to read at least one of the adjacent images.

Preferably, in the image forming apparatus, the colorimeter is located downstream of the reading section in a conveyance direction.

Preferably, the image forming apparatus further includes a circulation path which has an inlet downstream of the reading section in the conveyance direction and an outlet upstream of the colorimeter in the conveyance direction, and through which the sheet is circulated, and, in a case where the specification section specifies the adjacent images having the largest difference in brightness of the predetermined threshold value or more, the color adjustment section conveys the sheet to the circulation path and circulates the sheet until movement of the colorimeter is completed, and controls the colorimeter to read the second colorimeter measurement data after the movement of the colorimeter is completed.

Preferably, in the image forming apparatus, the color adjustment section controls the image forming section to form adjacent images having a largest difference in brightness of the predetermined threshold value or more at a position on the sheet to be read by the colorimeter.

Preferably, in the image forming apparatus, the color adjustment section controls the colorimeter to read an image having a higher density among the adjacent images.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein.

DETAILED DESCRIPTION OF THE PREFERRED EMBODIMENT

Hereinafter, an embodiment for performing the present invention will be described with the drawings. In the following description, the lateral direction in FIG. 1 is referred to as X direction, vertical direction is referred to as Z direction and the direction orthogonal to the X and Z directions, that is, the front-back direction is referred to as Y direction.

Figure 1:
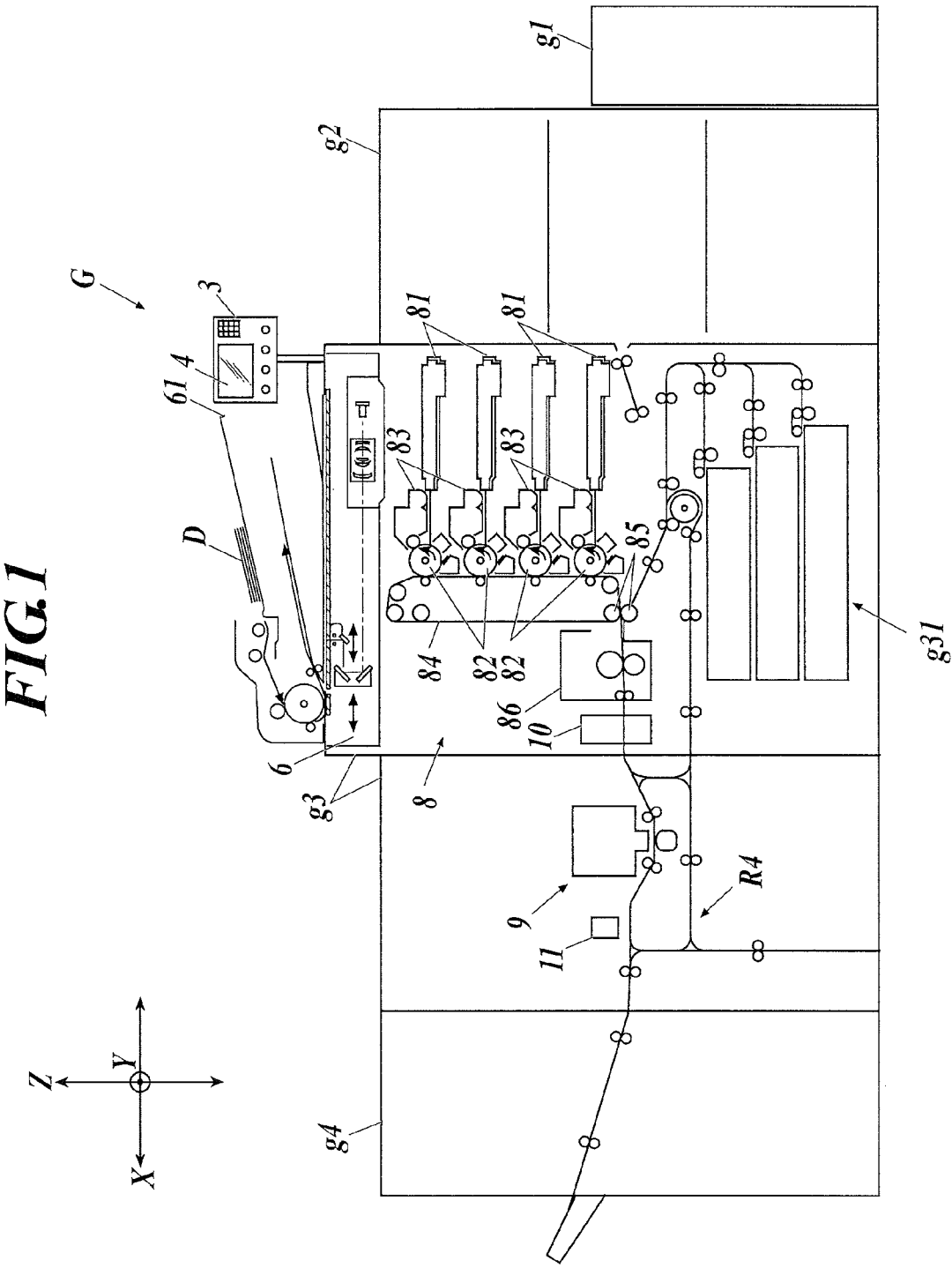
FIG. 1 is a schematic configuration view of an image forming apparatus according to the embodiment.

As shown in FIG. 1, an image forming apparatus G includes a print controller g1, a paper feeding unit g2, a main body unit g3 and a post-processing apparatus g4.

The print controller g1 receives PDL (Page Description Language) data from a computer terminal on a network and performs rasterizing processing to the PDL data to generate image data in bit map format.

The print controller g1 generates image data for each color of C (cyan), M (magenta), Y (yellow) and K (black) and outputs the data to the main body unit g3.

The paper feeding unit g2 includes a plurality of paper feeding trays having large capacities.

The paper feeding unit g2 conveys a sheet to the main body unit g3 from a paper feeding tray instructed by the main body unit g3.

Figure 2:
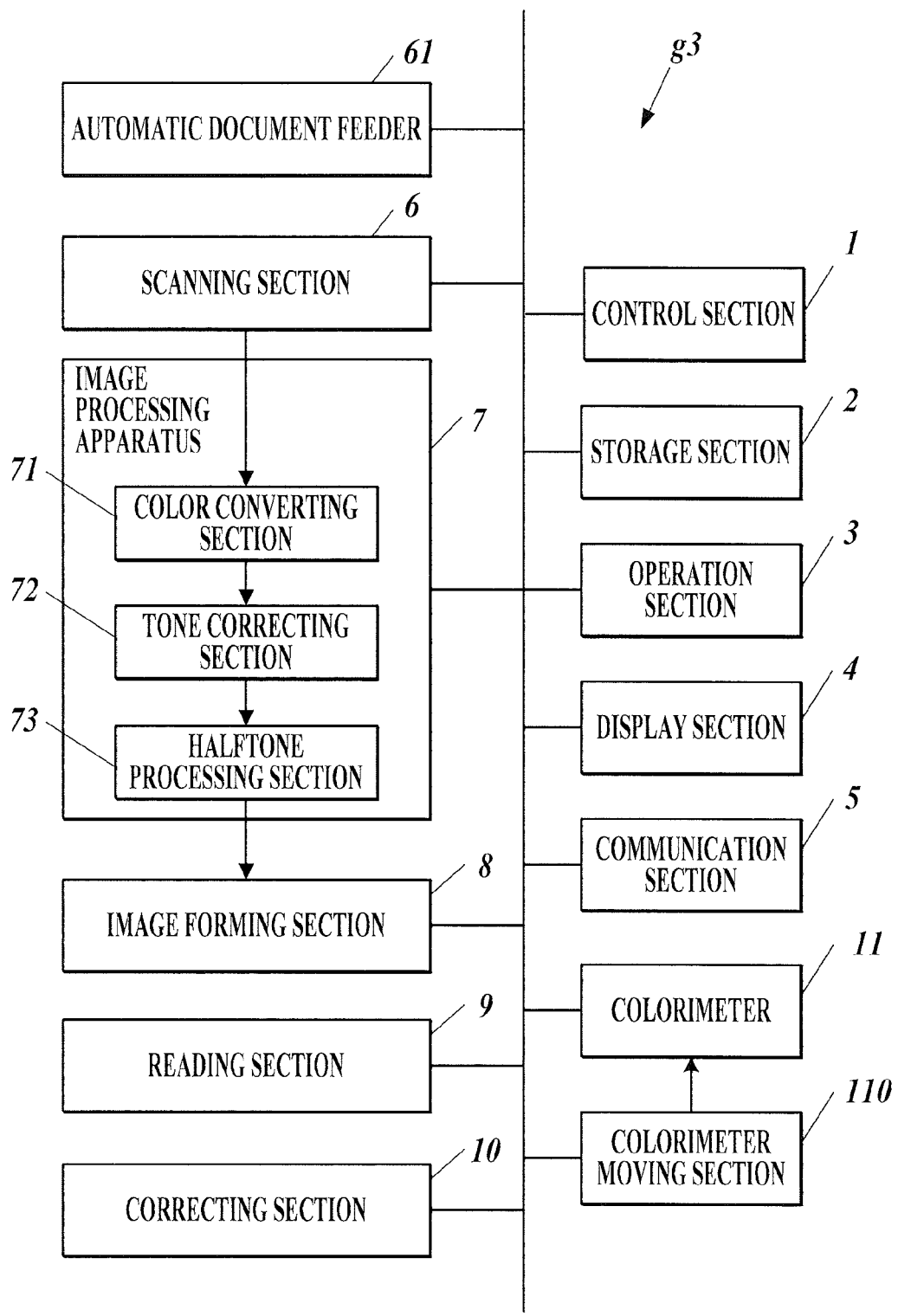
FIG. 2 is a functional block diagram of a main body unit.

As shown in FIGS. 1 and 2, the main body unit g3 includes a control section 1, a storage section 2, an operation section 3, a display section 4, a communication section 5, an automatic document feeder 61, a scanning section 6, an image processing apparatus 7, an image forming section 8, paper feeding trays g31, a reading section 9, a colorimeter 11, a colorimeter moving section 110, a correcting section 10 and such like.

The main body unit g3 forms an image on the sheet with the image forming section 8 on the basis of image data obtained by reading a document sheet D with the scanning section 6 or the image data generated by the print controller g1. The main body unit g3 conveys the sheet on which the image is formed to the post-processing apparatus g4.

The post-processing apparatus g4 performs post-processing to the sheet conveyed from the main body unit g3 and ejects the sheet. The post-processing includes, for example, stapling, punching, folding, book binding and such like. The post-processing is not essential, and executed by the post-processing apparatus g4 only when the main body unit g3 instructs the processing. In a case where the post-processing is not performed, the post-processing apparatus g4 directly ejects the conveyed sheet.

The control section 1 includes a CPU, a RAM and such like. The control section 1 reads a program stored in the storage section 2 and controls the sections of the image forming apparatus G according to the program.

For example, the control section 1 feeds a sheet with the paper feeding unit g2 or the paper feeding tray g3 according to the job setting. The control section 1 also controls the image processing apparatus 7 to correct or process the image data and controls the image forming section 8 to form an image. In a case where the job setting includes setting of post-processing, the control section 1 instructs the post-processing apparatus 4 to perform the post-processing.

The storage section 2 stores a program, a file and such like readable by the control section 1. As the storage section 2, recording medium such as a hard disk and a ROM (Read Only Memory) can be used, for example.

Figure 6:
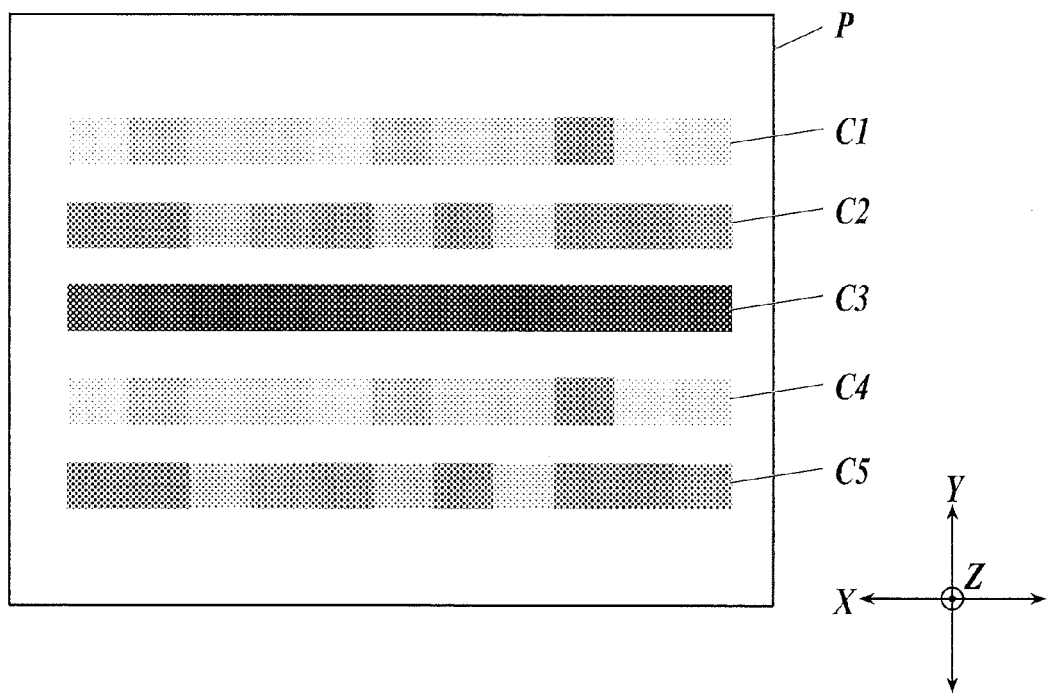
FIG. 6 is a plan view showing an example of a sheet on which an evaluation image for color adjustment is formed.

The storage section 2 stores reference image data for image quality adjustment, evaluation image data for calibrating the CCD 91, evaluation image (see FIG. 6) data for color adjustment and such like.

The operation section 3 includes operation keys, a touch panel integrally formed with the display section 4 and such like, and outputs an operation signal according to an operation to the control section 1. The user can input instructions such as setting of job and change of processing contents by the operation section 3.

The display section 4 includes an LCD (Liquid Crystal Display) and such like and displays an operation screen and such like according to the instruction of the control section 1.

The communication section 5 communicates with a computer on network such as a server or another image forming apparatus according to the instruction from the control section 1.

The automatic document feeder 61 is configured by including a placement tray for placing the document sheet D, a mechanism for conveying the document sheet D, a conveyance roller and such like, and conveys the document sheet D to a predetermined conveyance path.

The scanning section 6, which is configured by including an optical system such as a light source and a reflection mirror, reads an image of the document sheet D conveyed through the predetermined conveyance path or a document sheet D placed on a platen glass, generates image data for respective colors of R (red), G (green) and B (blue) and outputs the image data to the image processing apparatus 7.

The image processing apparatus 7 corrects image data input from the scanning section 6 or the print controller g1, performs image processing and outputs the data to the image forming section 8.

The image processing apparatus includes, as shown in FIG. 2, a color converting section 71, a tone correcting section 72 and a halftone processing section 73.

The color converting section 71 performs color conversion of image data of the respective colors of R, G and B output from the scanning section 6, and outputs the image data for respective colors of C, M, Y and K.

The color converting section 71 can also perform color conversion processing of image data for respective colors of C, M, Y and K output from the print controller g1 in order to perform color correction, and output the image data of the respective colors of C, M, Y and K for which color correction was formed.

When performing the color conversion processing, the color converting section 71 uses, an LUT which determines tone values for respective colors of C, M, Y and K after color conversion with respect to the tone values of respective colors of R, G and B. When performing color correction, the color converting section 71 uses an LUT which determines tone values of C, M, Y and K after color correction with respect to the tone values for respective colors of C, M, Y and K.

The tone correcting section 72 corrects tones of image data output from the color converting section 71 or the print controller g1.

When performing tone correction, the tone correcting section 72 uses an LUT which determines correction values corresponding to respective tone values so that the tone property of image matches the desired tone property. The tone correcting section 72 obtains the correction values corresponding to the tone values of respective pixels of image data from the LUT for tone correction and outputs the image data formed of the correction values.

The halftone processing section 73 performs halftone processing of image data output from the tone correcting section 72. The halftone processing includes screen processing using a dithering matrix and error diffusion processing, for example.

The halftone processing section 73 outputs image data after halftone processing to the image forming section 8.

The image forming section 8 forms an image on a sheet on the basis of image data output from the image processing apparatus 7.

As shown in FIG. 1, the image forming section 8 includes four sets of exposing section 81, photoreceptor 82 and developing section 83 for respective colors of C, M, Y and K. The image forming section 8 includes an intermediate transfer belt 84, secondary transfer rollers 85 and a fixing device (fixing section) 86.

The exposing section 81 includes an LD (Laser Diode) as a light emitting element. The exposing section 81 drives the LD on the basis of image data and preforms exposure by emitting laser beams onto a charged photoreceptor 82. The developing section 83 supplies toners onto the photoreceptor with a charged developing roller, and develops an electrostatic latent image which is formed on the photoreceptor 82 by the exposure.

The images formed on the four photoreceptors 82 with toners of respective colors in such way are sequentially transferred onto the intermediate transfer belt 84 from the respective photoreceptors 82 so as to be laminated on each other. Thus, a color image is formed on the intermediate transfer belt 84. The intermediate transfer belt 84 is an endless belt which is rolled by a plurality of rollers and is rotated according to rotations of the rollers.

The secondary transfer rollers 85 transfer the color image on the intermediate transfer belt 84 onto the sheet fed from the paper feeding unit g2 or the paper feeding tray g31. The fixing device 86 performs fixing by heating and pressing the sheet after the transferring.

Figure 3:
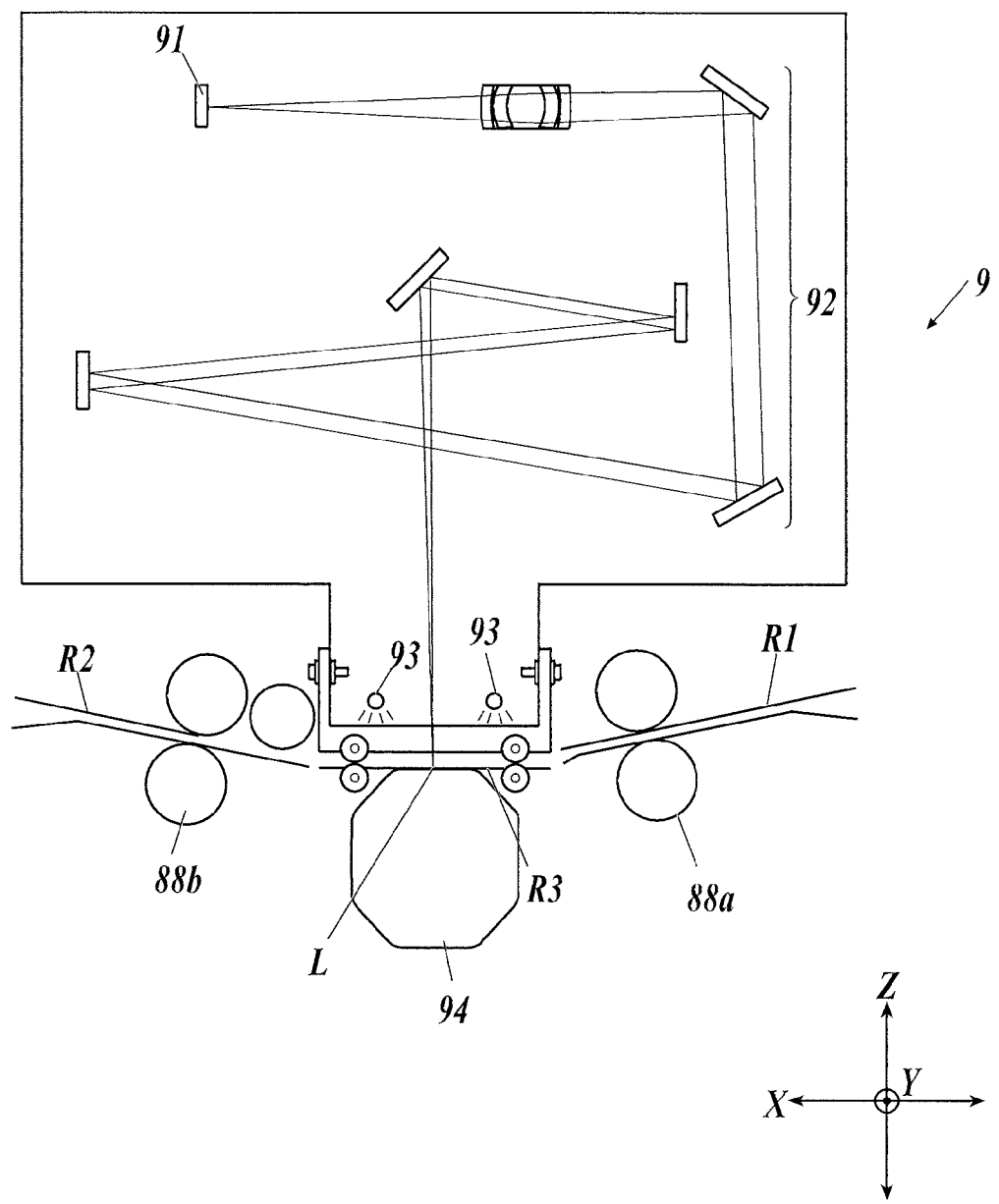
FIG. 3 is a lateral view showing a configuration of a reading section.

As shown in FIGS. 1 and 3, the reading section 9 performs reading of an image formed on the sheet which was conveyed from an upstream conveyance path R1 provided upstream of the reading section 9 in the conveyance direction. The sheet having the image read by the reading section 9 is conveyed from a downstream conveyance path R2 provided downstream of the reading section 9 in the conveyance direction to the post-processing apparatus g4. When the image reading is performed by the reading section 9, the sheet is conveyed so as to pass a reading position L at a predetermined speed by a plurality of conveyance rollers (upstream conveyance rollers 88a, downstream conveyance rollers 88b and such like) provided on the conveyance path.

The reading section 9 includes a CCD (Charge Coupled Device) 91 as an optical sensor which reads the image formed on the sheet at the predetermined reading position L, an optical system 92 for leading the image at the reading position L to the CCD 91, an LED (Light Emitting Diode) light source 93 which illuminates the reading position L and such like.

The optical system 92 is configured by including a plurality of mirrors and a plurality of lens.

The CCD 91 is a color line sensor which can read the entire width in the width direction (Y direction: main scanning direction) of the sheet.

The reading section 9 can sequentially read the image formed on the sheet over the entire width of the sheet passing the reading position L by having the above configuration.

A reading calibration section 94 is provided under the reading section conveyance path R3 of the reading section 9.

The reading calibration section 94 includes a white reference plate for determining a correction value of shading correction which is performed when the image is read. The white reference plate is provided to the reading position L and the reading is carried out with the CCD 91 at intervals when a sheet is not passing (for example, between the pass of sheets).

The colorimeter moving section 110 is configured by including a colorimeter 11 which is a color spot sensor capable of reading a partial range in the width direction (Y direction: main scanning direction) of the sheet, a motor (not shown in the drawings) which moves the colorimeter 11 in the main scanning direction and such like.

The colorimeter 11 is arranged downstream of the reading section 9 in the conveyance direction, spectroscopically measures the colors of respective color patches in an evaluation image formed by the image forming section 8 and obtains colorimetric data. The colorimetric data is represented by a color system such as XYZ which represents colors of respective color patches without depending on the device.

The colorimeter 11 can move in the main scanning direction by the control section 1 controlling the colorimeter moving section 110.

At the downstream side of the colorimeter 11 in the conveyance direction, separately from the conveyance path to the post-processing apparatus g4, there is provided a circulation path R4 through which the sheet can be conveyed again to the reading section 9 and the colorimeter 11.

The circulation path R4 has an inlet located downstream of the reading section 9 and the colorimeter 11 in the conveyance direction and has an outlet located downstream of the image forming section 8 in the conveyance direction and upstream of the reading section 9 and the colorimeter 11 in the conveyance direction. In the embodiment, when the colorimeter 11 is to be moved in the main scanning direction according to the read result by the CCD 91, the sheet can be conveyed again to the moved colorimeter 11 by circulating the sheet through the circulation path R4 until the colorimeter 11 has completely moved.

The correcting section 10 corrects the deformation of sheet after fixing processing and flattens the sheet surface. Here, the sheet is easily deformed due to the fixing processing, and thus, the sheet needs to be flattened when a reference image is read. Accordingly, as shown in FIG. 1, the correcting section 10 is located between the fixing device 86 and the reading section 9 in the conveyance direction of sheet.

Figure 4:
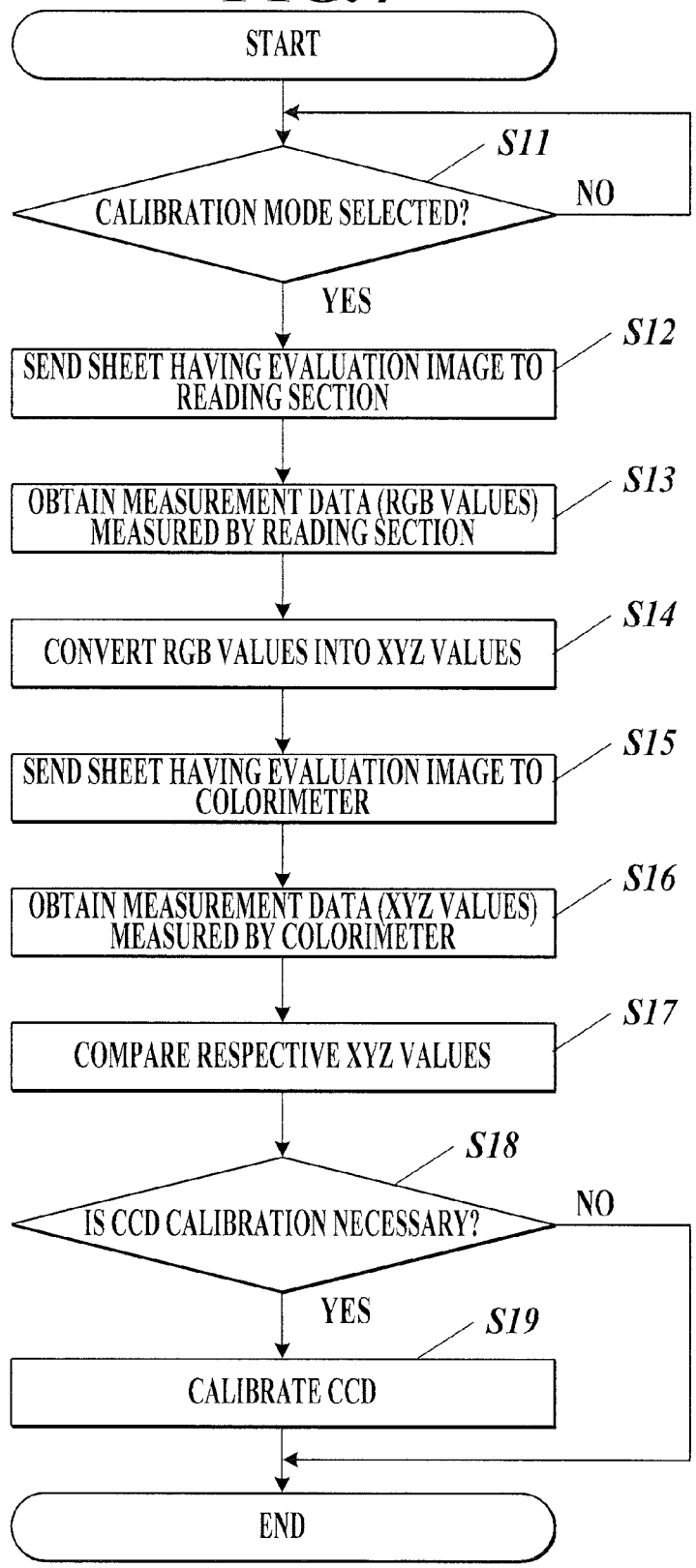
FIG. 4 is a flow chart showing an operation of CCD calibration by the image forming apparatus according to the embodiment.

Next, the operation of calibrating the CCD 91 by the image forming apparatus G according to the embodiment will be described with reference to the flow chart in FIG. 4.

First, the control section 1 determines whether the calibration mode for calibrating the CCD 91 is selected (step S11). For example, the control section 1 determines that the calibration mode is selected in a case where a signal indicating the selection of calibration mode is detected, the signal being input from the operation section 3 by a user or a serviceman.

If it is determined that the calibration mode is selected (step S11: YES), the processing shifts to the next step S12.

On the other hand, if it is not determined that the calibration mode is selected (step S11: NO), the processing of step S11 is repeated until the calibration mode is selected.

Next, the control section 1 sends the sheet on which an evaluation image for calibrating the CCD 91 is formed to the reading section 9 (step S12). Specifically, the control section 1 feeds the sheet from the paper feeding unit g2 or the paper feeding tray g31, forms the evaluation image for calibrating the CCD 91 on the sheet with the image forming section 8 and sends the sheet, to which fixing was performed by the fixing device 86, to the reading section 9.

Next, the control section 1 obtains measurement data (first reading section measurement data) measured by the CCD 91 of the reading section 9 (step S13). Specifically, the control section 1 controls the CCD 91 of the reading section 9 to read the evaluation image and obtains measurement data in which the read values are represented by RGB values. The CCD 91 reads the entire width of the main scanning direction (Y direction) of the sheet on which the evaluation image is formed.

Next, the control section 1 refers to the measurement data obtained in step S13, and converts the RGB values obtained by the CCD 91 to XYZ values (tristimulus values) (step S14). Here, the number of pixels in CCD 91 corresponding to aperture (3 mm) of the colorimeter 11 is approximately 167 pixels. Accordingly, the control section 1 averages the RGB values read at predetermined 167 pixels of CCD 91 and converts the averaged RGB values to XYZ values. This allows comparison with the read values of colorimeter 11.

Next, the control section 1 sends the sheet, which was sent to the reading section 9 in step S12, to the colorimeter 11 (step S15).

Next, the control section 1 obtains measurement data (first colorimeter measurement data) measured by the colorimeter 11 (step S16). Specifically, the control section 1 controls the colorimeter 11 to read the evaluation image and obtains the measurement data in which the read values are represented by XYZ values. The colorimeter 11 reads a partial region in the main scanning direction (Y direction) of the sheet on which the evaluation image is formed.

Next, the control section 1 obtains the XYZ values converted in step S14 and the XYZ values from spectral reflectivity read by the colorimeter 11 in step S16, and compares the XYZ values (step S17).

Next, the control section 1 refers to the comparison result obtained in step S17, and determines whether the CCD 91 needs to be calibrated (step S18). For example, the control section 1 determines that the CCD 91 needs to be calibrated in a case where the difference in XYZ values between the XYZ values converted in step S14 and the XYZ values calculated from spectral reflectivity read by the colorimeter 11 in step S16 is a predetermined threshold value or more.

If it is determined that the CCD 91 needs to be calibrated (step S18: YES), the processing shifts to next step S19.

On the other hand, if it is not determined that the CCD 91 needs to be calibrated (step S18: NO), the processing ends.

Next, the control section 1 calibrates the CCD 91 on the basis of the XYZ values converted in step S14 and the XYZ values read by the colorimeter 11 in step S16 (step S19). For example, the control section 1 calibrates the CCD 91 by shifting the read values of CCD 91 by the amount of difference between the XYZ values converted in step S14 and the XYZ values read by the colorimeter 11 in step S16.

That is, the control section 1 functions as a calibration section which calibrates the reading section 9 on the basis of the difference between the first reading section measurement data read by the reading section 9 and the first colorimeter measurement data read by the colorimeter 11 with respect to the image which is formed on the sheet for calibration.

Figure 5:
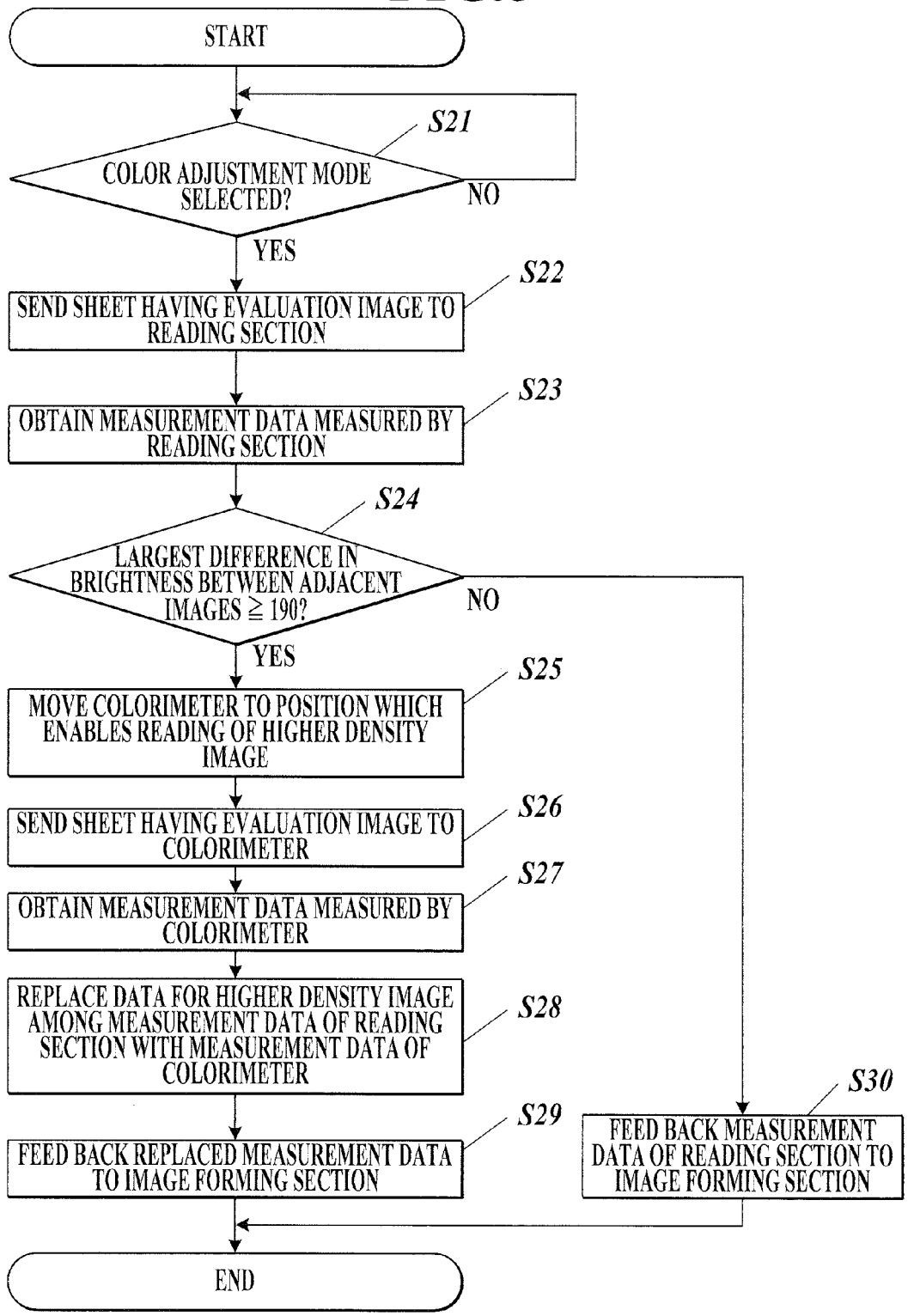
FIG. 5 is a flow chart showing an operation of color adjustment by the image forming apparatus according to the embodiment.

Next, the operation of color adjustment by the image forming apparatus G according to the embodiment will be described with reference to the flowchart of FIG. 5. The color adjustment processing shown in FIG. 5 is performed to treat the generation of flare. Specifically, the color adjustment processing is processing of specifying a position where flare is generated and adjusting the read value at the position in a case where a problem occurs in the reading by the CCD 91 due to the generation of flare. The embodiment will be described by illustrating a "case where a high density color patch C3 is arranged on a white sheet P (see FIG. 6)" as the evaluation image for color adjustment. The evaluation image shown in FIG. 6 includes middle density color patches C2 and C5 and low density color patches C1 and C4 in addition to the high density color patch C3, and the color patches are arranged in parallel in the main scanning direction in the order of C1 to C5.

First, the control section 1 determines whether the color adjustment mode for color adjustment is selected (step S21). For example, the control section 1 determines that the color adjustment mode was selected in a case where a signal is detected, the signal being input from the operation section 3 by a user or serviceman and indicating the selection of color adjustment mode.

If it is determined that the color adjustment mode is selected (step S21: YES), the processing shifts to the next step S22.

On the other hand, if it is not determined that the color adjustment mode is selected (step S21: NO), the processing of step S21 is repeated until the color adjustment mode is selected.

Next, the control section 1 sends the sheet on which the evaluation image for color adjustment is formed to the reading section 9 (step S22). Specifically, the control section 1 feeds the sheet from the paper feeding unit g2 or the paper feeding tray g31, forms the evaluation image for color adjustment on the sheet with the image forming section 8 and sends the sheet, to which the image was fixed by the fixing device 86, to the reading section 9.

Next, the control section 1 obtains measurement data (second reading section measurement data) measured by the CCD 91 of the reading section 9 (step S23). Specifically, the control section 1 controls the CCD 91 of the reading section 9 to read the evaluation image and obtains the measurement data in which the read values are represented by RGB values. The CCD 91 reads the entire width of the main scanning direction (Y direction) of the sheet on which the evaluation image is formed.

Next, the control section 1 refers to the measurement data obtained in step S23, and determines whether or not the largest difference in brightness between adjacent images is 190 or more (step S24). Specifically, the control section 1 refers to the measurement data obtained in step S23, and determines whether or not the largest difference in brightness is 190 or more among the differences in brightness between adjacent images, that is, between adjacent color patches or between a high density color patch and the ground color of the sheet. In the embodiment, the "image" includes not only an image formed on the sheet, but also the ground color portion of the sheet where an image is not formed. That is, in a case where color patches C1 to C5 are arranged on a white sheet P as in the embodiment, the white ground portion on which the color patches C1 to C5 are not arranged is also expressed as "image". Accordingly, the high density color patch C3 and the ground color of the sheet are expressed as "adjacent images".

Here, it is determined whether or not the largest difference in brightness is 190 or more because the read values are more likely to be affected by flare due to the stray light if the difference in brightness is 190 or more. That is, if it is determined that the largest difference in brightness is 190 or more, it can be predicted that the flare will occur when the images having the difference in brightness of 190 or more are read by the CCD 91. Thus, the position where the flare will be generated can be specified. In the example shown in FIG. 6, the difference in brightness between the ground color of sheet and the high density color patch C3 is 190 or more.

That is, the control section 1 functions as a specification section which specifies the adjacent images having the largest difference in brightness of a predetermined threshold value or more from images for color adjustment formed on the sheet. The control section 1 as the specification section specifies adjacent images having the largest difference in brightness of the predetermined threshold value or more from the second reading section measurement data read from the images for color adjustment by the reading section 9.

If it is determined that the largest difference in brightness is 190 or more (step S24: YES), it is determined that the influence by flare is not negligible and the color adjustment is necessary, and the processing shifts to the next step S25.

On the other hand, if it is not determined that the largest difference in brightness is 190 or more, that is, if it is determined that the largest difference in brightness is less than 190 (step S24: NO), it is determined that the influence by flare is negligible, and the measurement data obtained by the CCD 91 of the reading section 9 in step S23 is directly feed backed to the image forming section 8 (step S30).

Next, the control section 1 moves the colorimeter 11 in the main scanning direction to the position where the colorimeter 11 can read the image (color patch) which has a lower brightness, that is, a higher density image among the images which were determined to have the largest difference in brightness of 190 or more in step S24 (step S25). The colorimeter 11 is moved to the position where the colorimeter 11 can read the higher density image because the higher density image has a lower reflectivity (brightness value) leading to the large change in density which is caused even by a slight shift, and thus more easily affected negatively by the flare.

Figure 7A:
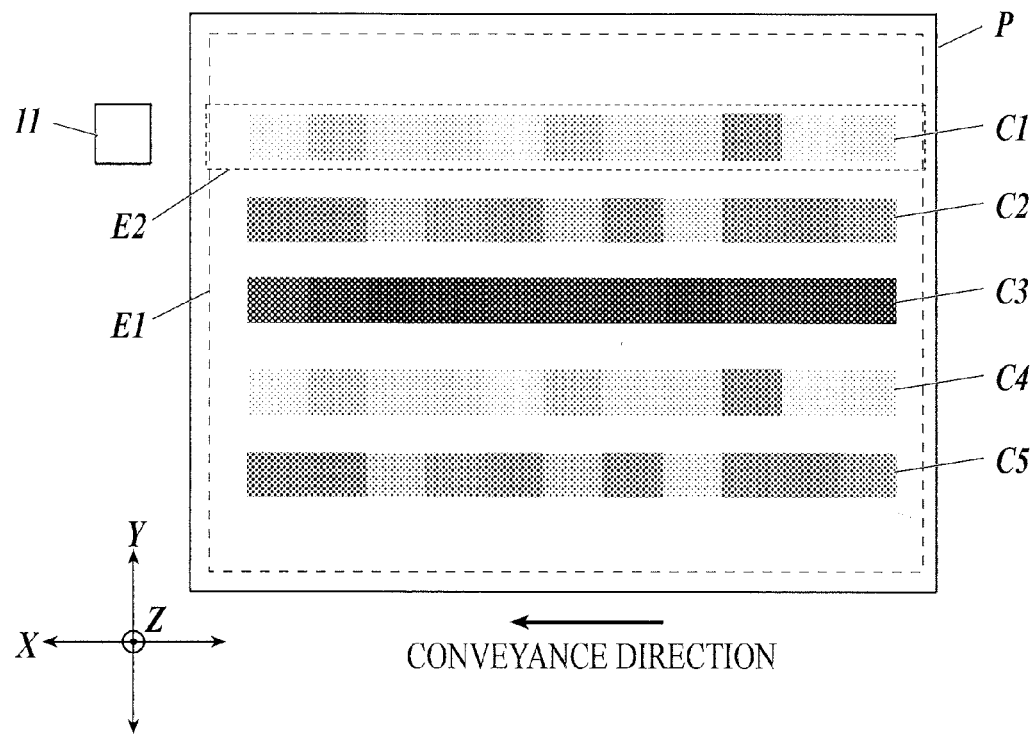
FIG. 7A is a plan view showing an example of the state before a colorimeter is moved in a main scanning direction.

In the embodiment, as shown in FIG. 7A, the initial position of colorimeter 11 is set at a position where the colorimeter 11 can read the color patch C1 having a low density. In step S25, the control section 1 controls the colorimeter moving section 110 to move the colorimeter 11 in the main scanning direction and locate the colorimeter 11 at the position where the colorimeter 11 can read the color patch C3 having a higher density (see FIG. 7B).

Figure 7B:
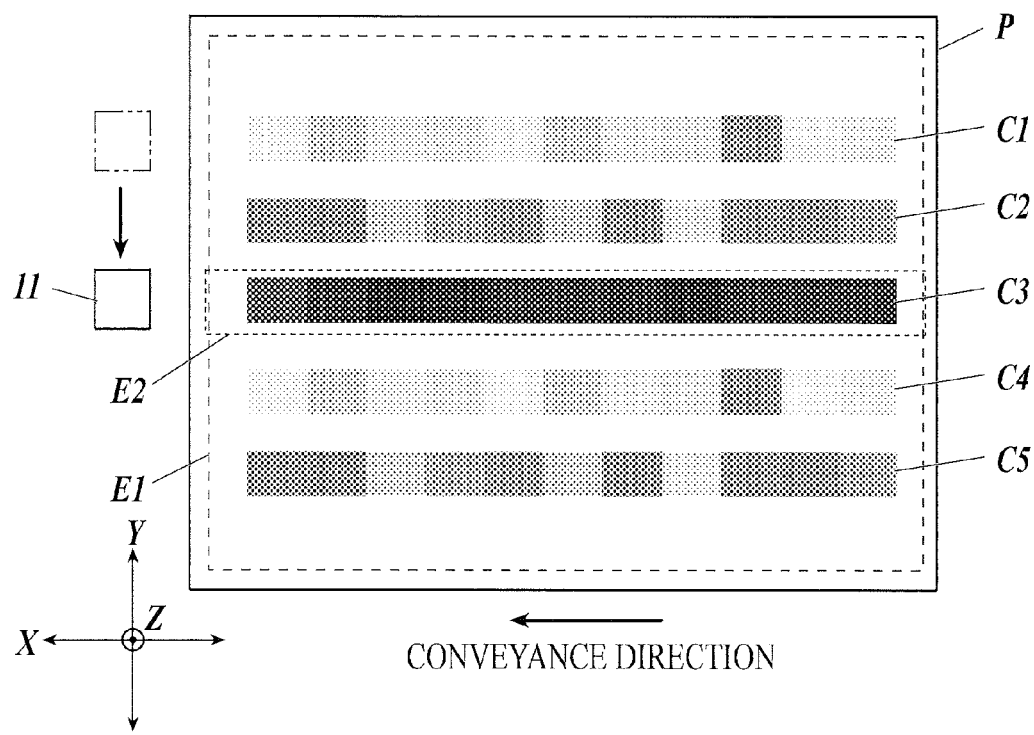
FIG. 7B is a plan view showing an example of the state after the colorimeter was moved in the main scanning direction.

The E1 in FIGS. 7A and 7B indicates the reading range of CCD 91 and the E2 indicates the reading range of colorimeter 11.

Here, there is a case where the sheet sent to the reading section 9 in step S22 passes the colorimeter 11 before the movement of colorimeter 11 in step S25 has completed. In such case, the measurement by the colorimeter 11 is not performed and the sheet passing the colorimeter 11 may be conveyed and circulated through the circulation path R4 to gain time until the movement of colorimeter 11 is completed. Alternatively, without conveying the sheet through the circulation path R4, the conveyance speed for conveying the sheet to the colorimeter 11 may be sufficiently lowered to gain time.

Next, the control section 1 sends the sheet sent to the reading section 9 in step S22 to the colorimeter 11 which has moved to the position where the colorimeter 11 can read the color patch C3 having a high density in step S25 (step S26).

The control section 1 obtains measurement data (second colorimeter measurement data) measured by the colorimeter 11 (step S27). Specifically, the control section 1 controls the colorimeter 11 to read the evaluation image and obtains the measurement data in which the read values are represented by XYZ values. The colorimeter 11 reads a partial region in the main scanning direction (Y direction) of the sheet on which the evaluation image is formed. In the embodiment, the colorimeter 11 reads the color patch C3 having a high density to obtain the measurement data according to the color patch C3 having a high density. Compared with the measurement by the CCD 91, the colorimeter 11 has a smaller reading range of evaluation image, and thus can eliminate the influence by the flare.

Next, the control section 1 replaces the measurement data of a portion according to the high density color patch C3 among the measurement data obtained by the CCD 91 of reading section 9 in step S23 with the measurement data obtained by the colorimeter 11 in step S27 (step S28). Thus, it is possible to obtain measurement data in which the influence by flare is eliminated.

The control section 1 feeds back the measurement data after replacement which was obtained in step S28 to the image forming section 8 (step S29). Specifically, the control section 1 performs color adjustment of image formed by the image forming section 8 on the basis of the measurement data after replacement which was obtained in step S28.

That is, the control section 1 functions as a color adjustment section which controls the colorimeter 11 to read at least one of the adjacent images specified by the specification section and performs color adjustment of image formed by the image forming section 8 on the basis of the second colorimeter measurement data read by the colorimeter 11.

As described above, the image forming apparatus G according to the embodiment includes: the colorimeter 11 which reads a partial region in the main scanning direction of the image; the calibration section (control section 1) which calibrates the reading section 9 on the basis of the difference between the first reading section measurement data obtained by reading image for calibration formed on the sheet with the reading section 9 and the first colorimeter measurement data obtained by reading the image for calibration with the colorimeter 11; the specification section (control section 1) which specifies adjacent images which have the largest difference in brightness of a predetermined threshold value or more from among images for color adjustment formed on the sheet; and the color adjustment section (control section 1) which controls the colorimeter 11 to read at least one of the adjacent images specified by the specification section and adjusts a color of the image formed by the image forming section 8 on the basis of the second colorimeter measurement data read by the colorimeter 11.

Accordingly, according to the image forming apparatus G in the embodiment, it is possible to specify the point where the flare is generated and complement the data by reading the position with the colorimeter 11, and thus, colors can be reproduced with high accuracy.

For example, in a case where there is a difference of 0.1 or more between the measurement value (reflection density) of the CCD 91 and the measurement value (reflection density) of the colorimeter 11 such as a case where the density cannot be read correctly by the CCD 91 of the reading section 9 due to the generation of flare, it has been difficult to correct the color accurately. However, the image forming apparatus G according to the embodiment can also treat such case.

According to the image forming apparatus G in the embodiment, the colorimeter 11 is built therein and can perform calibration work automatically, saving the troublesome work such as manual measurement of offline by an external colorimeter and improving the productivity.

According to the image forming apparatus G in the embodiment, the specification section specifies adjacent images having the largest difference in brightness of a predetermined threshold value or more from the second reading section measurement data obtained by reading the image for color adjustment with the reading section 9. Thus, it is possible to easily specify the flare generating point by using the measurement result of the reading section 9 which is already provided without providing a new device, and thus the cost increases can be suppressed.

The image forming apparatus G in the embodiment further includes the colorimeter moving section 110 for moving the colorimeter 11 in the main scanning direction, and the color adjustment section controls the colorimeter moving section 110 to move the colorimeter 11 to a position which enables the reading of at least one of the adjacent images. Thus, desired data can be obtained by a simplified configuration in which the colorimeter 11 is moved in the main scanning direction, and thus, it is possible to suppress the enlargement and cost increases of apparatus.

In the image forming apparatus G according to the embodiment, the colorimeter 11 is located downstream of the reading section 9 in the conveyance direction.

The image forming apparatus G according to the embodiment includes the circulation path R4 which has an inlet located downstream of the reading section 9 in the conveyance direction and an outlet upstream of the colorimeter 11 in the conveyance direction and circulates the sheet, and in a case where the specification section specifies adjacent images having the largest difference in brightness of a predetermined threshold value or more, the color adjustment section conveys the sheet to the circulation path R4 to circulate the sheet until the movement of the colorimeter 11 has completed, and reads the second colorimeter measurement data with the colorimeter 11 after the movement of colorimeter 11 has completed.

Accordingly, according to the image forming apparatus G in the embodiment, it is possible to gain time until the movement of the colorimeter 11 has completed, and thus, it is possible to obtain only the desired measurement data without obtaining unnecessary measurement data with the moving colorimeter 11.

According to the image forming apparatus G in the embodiment, the color adjustment section reads the image having a higher density among the adjacent images with the colorimeter 11, and thus, it is possible to complement the image which is more likely to be affected by the flare, and reproduce the color with high accuracy.

Though the embodiment according to the present invention has been specifically described above, the present invention is not limited to the above embodiment and changes can be made within the scope of the present invention.

Modification Example

Figure 8:
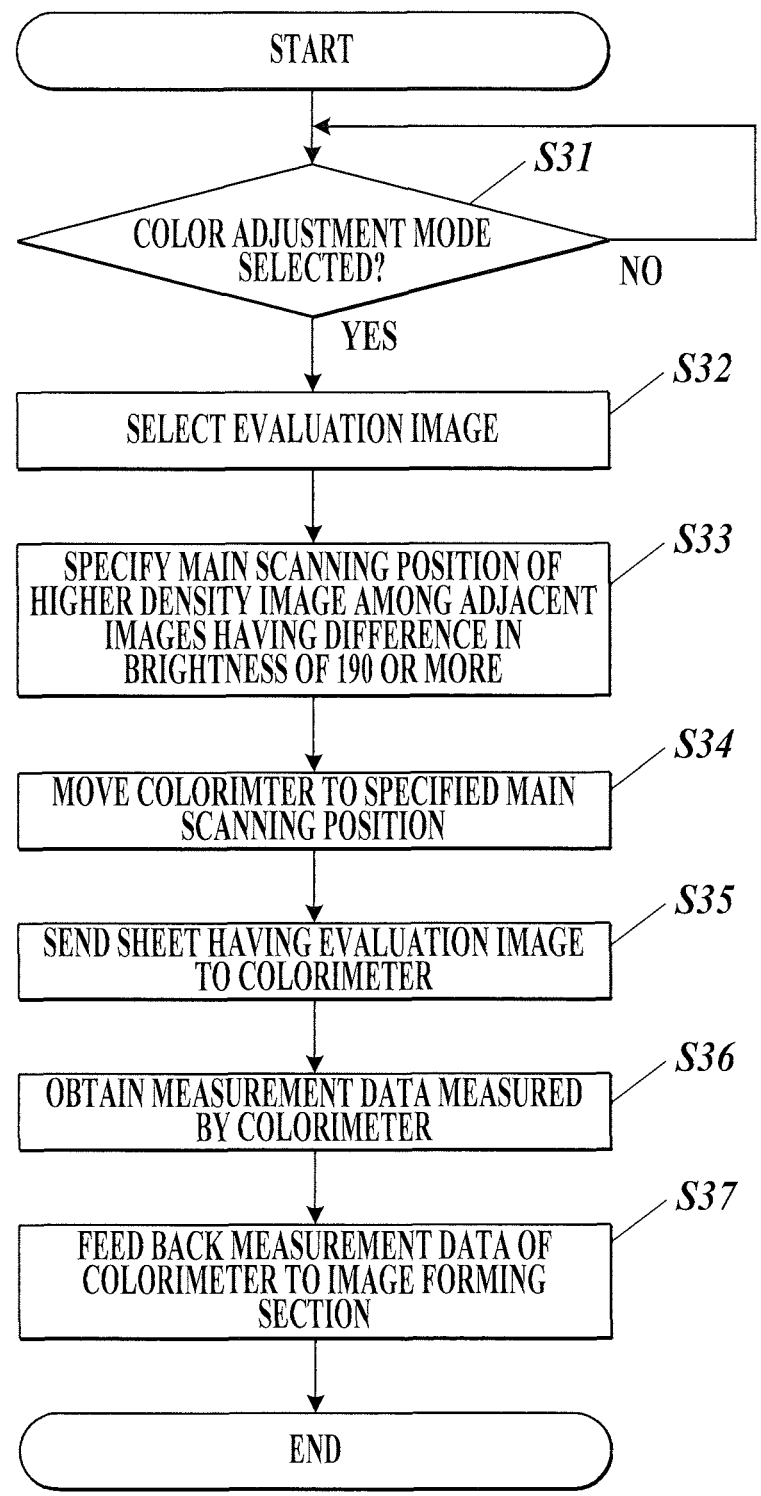
FIG. 8 is a flow chart showing an operation of color adjustment by an image forming apparatus according to a modification example.

For example, in an example shown by FIG. 8, the operation of color adjustment is different from that of the above embodiment. Since the configuration of the apparatus in the modification example is similar to that of the embodiment, the detailed explanation thereof is omitted by providing the same reference numerals.

Hereinafter, the operation of color adjustment by image forming apparatus G according to the modification example will be described with reference to the flow chart in FIG. 8.

First, since the processing in step S31 is similar to the processing in step S21 of FIG. 5 showing the operation of color adjustment by the image forming apparatus G according to the embodiment, the explanation thereof is omitted.

Next, the control section 1 selects an evaluation image (see FIG. 6) for color adjustment (step S32). The data of evaluation image for color adjustment is stored in the storage section 2 in advance.

The control section 1 refers to the data of evaluation image for color adjustment selected in step S32, and specifies the main scanning position of the image having the higher density among the adjacent images having the difference in brightness of 190 or more (step S33). The modification example focuses on that the data of evaluation image for color adjustment is stored in the storage section 2 in advance, and thus, it is possible to specify the main scanning position of the high density image (high density color patch C3) without reading the evaluation image with the CCD 91 of the reading section 9.

The control section 1 moves the colorimeter 11 to the main scanning position specified in step S33 (step S34).

The control section 1 sends the sheet on which the evaluation image for color adjustment is formed to the colorimeter 11 which was moved to the predetermined main scanning position in step S34 (step S35). Specifically, the control section 1 feeds the sheet from the paper feeding unit g2 or the paper feeding tray g31, forms the evaluation image for color adjustment on the sheet with the image forming section 8 and sends the sheet on which the image was fixed by the fixing device 86 to the colorimeter 11 which was moved to the main scanning position enabling the reading of high density color patch C3 in step S34.

Since the processing in step S36 is similar to that of step S27 in FIG. 5, the explanation thereof is omitted.

The control section 1 feeds back the measurement data obtained by the colorimeter 11 in step S36 to the image forming section 8 (step S37). Specifically, the control section 1 adjusts the color of image formed by the image forming section 8 on the basis of the measurement data obtained by the colorimeter 11 in step S36. Thus, as for the data of the portion according to the high density color patch C3 in the data of the evaluation image stored in the storage section 2, color adjustment can be performed by using the measurement data obtained by the colorimeter 11 in step S36, and thus, the measurement data eliminating the influence by flare can be obtained.

As described above, according to the image forming apparatus G in the modification example, the main scanning position of the high density image (high density color patch C3) can be specified without reading the evaluation image with the CCD 91 of the reading section 9, and thus, it is possible to move the colorimeter 11 in advance before sending the sheet, and perform color adjustment without sending the sheet via the circulation path R4. Accordingly, it is possible to have a configuration without the circulation path R4, and shorten the processing time according to the color adjustment.

According to the image forming apparatus G in the modification example, it is not necessary to read the evaluation image with the CCD 91 of the reading section 9 when performing color adjustment, and thus, it is possible to provide the colorimeter 11 upstream of the reading section 9 in the conveyance direction.

Other Modification Examples

In the above embodiment, the colorimeter 11 is moved to the position enabling the reading of high density color patch C3; however, the present invention is not limited to this. For example, the color adjustment section may control the image forming section 8 to form adjacent images (high density color patch C3) having the largest difference in brightness of the predetermined threshold value or more at the position to be read by the colorimeter 11 on the sheet.

Thus, since it is not necessary to provide the colorimeter moving section 110 which moves the colorimeter 11, the desired data can be obtained with a more simplified configuration. It is also not necessary to gain time for moving the colorimeter 11, thus enabling a configuration in which the colorimeter 11 is provided upstream of the reading section 9 in the conveyance direction and a configuration in which the circulation path R4 it not provided.

Instead of forming a high density color patch C3 at the position on the sheet to be read by the colorimeter 11, the apparatus may also be configured that the sheet can be swung in the main scanning direction, and the sheet may be swung in the main scanning direction so that the high density color patch C3 is located at the position to be read by the colorimeter 11.

The embodiment has been described by illustrating the "case where the high density color patch C3 is arranged on the white sheet P (see FIG. 6)" as the evaluation image for color adjustment; however, the present invention is not limited to this. That is, as the evaluation image for color adjustment, an image including adjacent color patches which have a large difference in brightness therebetween may be used.

In the embodiment, the determination section determines whether or not the largest difference in brightness between adjacent images is a predetermined threshold value, specifically, 190 or more; however, the present invention is not limited to this. The predetermined threshold value may be any numeral value as long as it is 190 or more, and can be 200, for example.

In the embodiment, the colorimeter 11 is moved to the position enabling the reading of the high density color patch C3; however, the present invention is not limited to this. That is, the colorimeter 11 may be moved to the position enabling the reading of the image having the higher brightness, that is, the lower density image (color patch or ground color portion of the sheet) among the images which are determined to have the largest difference in brightness of 190 or more in step S24 of FIG. 5.

In the embodiment, the circulation path R4 through which the sheet can be conveyed again to the reading section 9 and the colorimeter 11 is provided downstream of the colorimeter 11 in the conveyance direction; however, the present invention is not limited to this. That is, the circulation path R4 may have any configuration as long as it has an inlet downstream of the reading section 9 in the conveyance direction and an outlet upstream in the conveyance direction of the colorimeter 11. Preferably, the outlet of the circulation path R4 is formed downstream in the conveyance direction of the fixing device 86.

Also, the other detailed configurations of devices forming the image reading apparatus and the image forming apparatus and detailed operations of the devices can be appropriately changed within the scope of the present invention.

According to one aspect of a preferred embodiment of the present invention, there is provided an image forming apparatus, including: an image forming section which forms an image on a sheet; a reading section which reads the image formed by the image forming section over a predetermined width in a width direction of the sheet; a colorimeter which reads the image over a width smaller than the predetermined width in the width direction of the sheet; a calibration section which calibrates the reading section on the basis of a difference between first reading section measurement data and first colorimeter measurement data, the first reading section measurement data being obtained by reading an image for calibration formed on the sheet with the reading section, and the first colorimeter measurement data being obtained by reading the image for calibration with the colorimeter; a specification section which specifies adjacent images having a largest difference in brightness of a predetermined threshold value or more from among images for color adjustment formed on the sheet; and a color adjustment section which controls the colorimeter to read at least one of the adjacent images specified by the specification section and adjusts a color of the image formed by the image forming section on the basis of second colorimeter measurement data obtained by the colorimeter.

The image forming apparatus can reproduce colors with high accuracy.

The entire disclosure of Japanese Patent Application No. 2014-115426 filed on Jun. 4, 2014 including description, claims, drawings, and abstract are incorporated herein by reference in its entirety.

What is claimed is:

1. An image forming apparatus, comprising:
   an image forming section which forms an image on a sheet;
   a reading section which reads the image formed by the image forming section over a predetermined width in a width direction of the sheet;
   a colorimeter which reads the image over a width smaller than the predetermined width in the width direction of the sheet;
   a calibration section which calibrates the reading section on the basis of a difference between first reading section measurement data and first colorimeter measurement data, the first reading section measurement data being obtained by reading an image for calibration formed on the sheet with the reading section, and the first colorimeter measurement data being obtained by reading the image for calibration with the colorimeter;
   a specification section which specifies adjacent images having a largest difference in brightness of a predetermined threshold value or more from among images for color adjustment formed on the sheet; and
   a color adjustment section which controls the colorimeter to read at least one of the adjacent images specified by the specification section and adjusts a color of the image formed by the image forming section on the basis of second colorimeter measurement data obtained by the colorimeter.

2. The image forming apparatus according to claim 1, wherein the reading section reads the image formed by the image forming section over an entire width in the width direction of the sheet.

3. The image forming apparatus according to claim 1, wherein the specification section specifies the adjacent images having the largest difference in brightness of the predetermined threshold value or more from second reading section measurement data obtained by reading the images for color adjustment with the reading section.

4. The image forming apparatus according to claim 1, comprising a colorimeter moving section which moves the colorimeter in a main scanning direction, wherein the color adjustment section controls the colorimeter moving section to move the colorimeter to a position where the colorimeter is able to read at least one of the adjacent images.

5. The image forming apparatus according to claim 4, wherein the colorimeter is located downstream of the reading section in a conveyance direction.

6. The image forming apparatus according to claim 5, further comprising a circulation path which has an inlet downstream of the reading section in the conveyance direction and an outlet upstream of the colorimeter in the conveyance direction, and through which the sheet is circulated,
   wherein, in a case where the specification section specifies the adjacent images having the largest difference in brightness of the predetermined threshold value or more, the color adjustment section conveys the sheet to the circulation path and circulates the sheet until movement of the colorimeter is completed, and controls the colorimeter to read the second colorimeter measurement data after the movement of the colorimeter is completed.

7. The image forming apparatus according to claim 1, wherein the color adjustment section controls the image forming section to form adjacent images having a largest difference in brightness of the predetermined threshold value or more at a position on the sheet to be read by the colorimeter.

8. The image forming apparatus according to claim 1, wherein the color adjustment section controls the colorimeter to read an image having a higher density among the adjacent images.

\* \* \* \* \*